(12) United States Patent
Lord (10) Patent No.: US 8,832,453 B2
(45) Date of Patent: Sep. 9, 2014

(54) TOKEN RECYCLING

(75) Inventor: Robert Lord, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 1103 days.

(21) Appl. No.: 11/679,976

(22) Filed: Feb. 28, 2007

(65) Prior Publication Data

US 2008/0209224 A1  Aug. 28, 2008

(51) Int. Cl.
*H04L 29/06* (2006.01)
*G06F 21/31* (2013.01)

(52) U.S. Cl.
CPC ............. *H04L 63/083* (2013.01); *H04L 63/166* (2013.01); *G06F 21/31* (2013.01); *H04L 63/0869* (2013.01)
USPC .................................. 713/185; 726/6; 726/9

(58) Field of Classification Search
USPC .......................................... 713/185; 726/6, 9
See application file for complete search history.

(56) References Cited

U.S. PATENT DOCUMENTS

| 4,108,367 | A | 8/1978 | Hannan |
| 4,849,614 | A | 7/1989 | Watanabe et al. |
| 4,924,330 | A | 5/1990 | Seamons et al. |
| 5,247,163 | A | 9/1993 | Ohno et al. |
| 5,355,414 | A | 10/1994 | Hale et al. |
| 5,499,371 | A | 3/1996 | Henninger et al. |
| 5,594,227 | A | 1/1997 | Deo |
| 5,631,961 | A | 5/1997 | Mills et al. |
| 5,666,415 | A | 9/1997 | Kaufman |
| 5,721,781 | A | 2/1998 | Deo et al. |
| 5,745,576 | A | 4/1998 | Abraham et al. |
| 5,745,678 | A | 4/1998 | Herzberg et al. |
| 5,768,373 | A | 6/1998 | Lohstroh et al. |
| 5,862,310 | A | 1/1999 | Crawford et al. |
| 5,923,884 | A | 7/1999 | Peyret et al. |
| 5,937,066 | A | 8/1999 | Gennaro et al. |
| 5,943,423 | A | 8/1999 | Muftic |
| 5,991,411 | A | 11/1999 | Kaufman et al. |

(Continued)

FOREIGN PATENT DOCUMENTS

| WO | 9724831 | 7/1997 |
| WO | 0048064 A1 | 8/2000 |
| WO | WO 2007096590 A1 * | 8/2007 |

OTHER PUBLICATIONS

ATM and Credit Card Notification, Feb. 2005 (internet archive) pp. 1-2, www.thereareplaces.com/infgdes/money.atmnotif.htm.

(Continued)

*Primary Examiner* — Vu Le
*Assistant Examiner* — Tracy Mangialaschi
(74) *Attorney, Agent, or Firm* — Lowenstein Sandler LLP (57) ABSTRACT

Embodiments of the present invention provide for recycling a locked token in an enterprise. A secure connection can be established between a locked token and a server and a security process activated to determine an identity of an authorized user of the locked token. An unlock procedure can be activated to unlock the locked token upon receipt of an out-of-band parameter associated with a requester of the unlock procedure to produce an unlocked token. The out-of-band parameter can be provided by the requester of the unlock procedure in an independent communication to an enterprise agent associated with the security server so as to verify that the requester is the authorized user of the locked token. A password reset process associated with a new password for the unlocked token can be activated to provide an assigned password or a password entered by the requester.

16 Claims, 8 Drawing Sheets

(56) References Cited

U.S. PATENT DOCUMENTS

| | | |
|---|---|---|
| 5,991,882 A | 11/1999 | O'Connell |
| 6,005,942 A | 12/1999 | Chan et al. |
| 6,005,945 A | 12/1999 | Whitehouse |
| 6,011,847 A | 1/2000 | Follendore, III |
| 6,016,476 A | 1/2000 | Maes et al. |
| 6,044,155 A | 3/2000 | Thomlinson et al. |
| 6,072,876 A | 6/2000 | Obata et al. |
| 6,141,420 A | 10/2000 | Vanstone et al. |
| 6,178,507 B1 | 1/2001 | Vanstone |
| 6,179,205 B1 | 1/2001 | Sloan |
| 6,226,744 B1 | 5/2001 | Murphy et al. |
| 6,360,092 B1 * | 3/2002 | Carrara ............ 455/410 |
| 6,377,825 B1 | 4/2002 | Kennedy et al. |
| 6,490,680 B1 | 12/2002 | Scheidt et al. |
| 6,502,108 B1 | 12/2002 | Day et al. |
| 6,539,093 B1 | 3/2003 | Asad et al. |
| 6,636,975 B1 | 10/2003 | Khidekel et al. |
| 6,643,701 B1 | 11/2003 | Aziz et al. |
| 6,687,190 B2 | 2/2004 | Momich et al. |
| 6,691,137 B1 | 2/2004 | Kishi |
| 6,698,654 B1 | 3/2004 | Zuppicich |
| 6,734,886 B1 | 5/2004 | Hagan et al. |
| 6,760,752 B1 | 7/2004 | Liu et al. |
| 6,804,687 B2 | 10/2004 | Sampson |
| 6,819,766 B1 | 11/2004 | Weidong |
| 6,826,686 B1 | 11/2004 | Peyravian |
| 6,829,712 B1 | 12/2004 | Madoukh |
| 6,880,037 B2 | 4/2005 | Boyer |
| 6,880,084 B1 | 4/2005 | Brittenham et al. |
| 6,898,605 B2 | 5/2005 | Constantino |
| 6,898,714 B1 | 5/2005 | Nadalin et al. |
| 6,931,133 B2 | 8/2005 | Andrews et al. |
| 6,941,326 B2 | 9/2005 | Kadyk et al. |
| 6,970,970 B2 | 11/2005 | Jung et al. |
| 6,978,933 B2 | 12/2005 | Yap et al. |
| 6,986,040 B1 | 1/2006 | Kramer et al. |
| 7,007,105 B1 | 2/2006 | Sullivan et al. |
| 7,010,600 B1 | 3/2006 | Prasad et al. |
| 7,050,589 B2 | 5/2006 | Kwan |
| 7,051,213 B1 | 5/2006 | Kobayashi et al. |
| 7,085,386 B2 | 8/2006 | Audebert et al. |
| 7,114,028 B1 | 9/2006 | Green et al. |
| 7,156,302 B2 | 1/2007 | Yap et al. |
| 7,159,763 B2 | 1/2007 | Yap et al. |
| 7,185,018 B2 | 2/2007 | Archbold et al. |
| 7,251,728 B2 | 7/2007 | Toh et al. |
| 7,278,581 B2 | 10/2007 | Ong |
| 7,299,364 B2 | 11/2007 | Noble et al. |
| 7,302,585 B1 | 11/2007 | Proudler et al. |
| 7,356,688 B1 | 4/2008 | Wang |
| 7,374,099 B2 | 5/2008 | de Jong |
| 7,386,705 B2 | 6/2008 | Low et al. |
| 7,437,757 B2 | 10/2008 | Holdsworth |
| 7,451,921 B2 | 11/2008 | Dowling et al. |
| 7,475,250 B2 | 1/2009 | Aull et al. |
| 7,475,256 B2 | 1/2009 | Cook |
| 7,480,384 B2 | 1/2009 | Peyravian et al. |
| 7,502,793 B2 | 3/2009 | Snible et al. |
| 7,571,321 B2 | 8/2009 | Appenzeller et al. |
| 7,602,910 B2 | 10/2009 | Johansson et al. |
| 7,702,917 B2 | 4/2010 | Tevosyan et al. |
| 7,769,996 B2 | 8/2010 | Randle et al. |
| 7,822,209 B2 | 10/2010 | Fu et al. |
| 7,860,243 B2 | 12/2010 | Zheng et al. |
| 2001/0008012 A1 | 7/2001 | Kausik |
| 2001/0036276 A1 | 11/2001 | Ober et al. |
| 2001/0054148 A1 | 12/2001 | Hoornaert et al. |
| 2002/0004816 A1 | 1/2002 | Vange et al. |
| 2002/0007351 A1 | 1/2002 | Hillegass et al. |
| 2002/0007359 A1 | 1/2002 | Nguyen |
| 2002/0010679 A1 | 1/2002 | Felsher |
| 2002/0029343 A1 | 3/2002 | Kurita |
| 2002/0056044 A1 | 5/2002 | Andersson |
| 2002/0059144 A1 | 5/2002 | Meffert et al. |
| 2002/0064095 A1 | 5/2002 | Momich et al. |
| 2002/0080958 A1 | 6/2002 | Ober et al. |
| 2002/0099727 A1 | 7/2002 | Kadyk et al. |
| 2002/0112156 A1 | 8/2002 | Gien et al. |
| 2002/0120842 A1 | 8/2002 | Bragstad et al. |
| 2002/0133707 A1 | 9/2002 | Newcombe |
| 2002/0171546 A1 | 11/2002 | Evans et al. |
| 2002/0184149 A1 | 12/2002 | Jones |
| 2002/0188848 A1 | 12/2002 | Buttiker |
| 2003/0005291 A1 | 1/2003 | Burn |
| 2003/0012386 A1 | 1/2003 | Kim et al. |
| 2003/0028664 A1 | 2/2003 | Tan et al. |
| 2003/0035548 A1 | 2/2003 | Kwan |
| 2003/0037259 A1 * | 2/2003 | Koistinen et al. ............ 713/201 |
| 2003/0056099 A1 | 3/2003 | Asanoma et al. |
| 2003/0075610 A1 | 4/2003 | Ong |
| 2003/0093695 A1 | 5/2003 | Dutta |
| 2003/0115455 A1 | 6/2003 | Aull et al. |
| 2003/0115466 A1 | 6/2003 | Aull et al. |
| 2003/0115467 A1 | 6/2003 | Aull et al. |
| 2003/0115468 A1 | 6/2003 | Aull et al. |
| 2003/0167399 A1 * | 9/2003 | Audebert et al. ............ 713/191 |
| 2003/0172034 A1 | 9/2003 | Schneck et al. |
| 2004/0042620 A1 | 3/2004 | Andrews et al. |
| 2004/0053642 A1 | 3/2004 | Sandberg et al. |
| 2004/0066274 A1 | 4/2004 | Bailey |
| 2004/0088562 A1 | 5/2004 | Vassilev et al. |
| 2004/0096055 A1 | 5/2004 | Williams et al. |
| 2004/0103324 A1 * | 5/2004 | Band ............... 713/202 |
| 2004/0103325 A1 * | 5/2004 | Priebatsch ............ 713/202 |
| 2004/0120525 A1 | 6/2004 | Miskimmin et al. |
| 2004/0144840 A1 | 7/2004 | Lee et al. |
| 2004/0146163 A1 | 7/2004 | Asokan et al. |
| 2004/0153451 A1 | 8/2004 | Phillips et al. |
| 2004/0162786 A1 | 8/2004 | Cross et al. |
| 2004/0230831 A1 | 11/2004 | Spelman et al. |
| 2005/0022123 A1 | 1/2005 | Costantino |
| 2005/0033703 A1 | 2/2005 | Holdsworth |
| 2005/0109841 A1 | 5/2005 | Ryan et al. |
| 2005/0114673 A1 | 5/2005 | Raikar et al. |
| 2005/0119978 A1 | 6/2005 | Ates |
| 2005/0123142 A1 | 6/2005 | Freeman et al. |
| 2005/0138386 A1 | 6/2005 | Le Saint |
| 2005/0138390 A1 | 6/2005 | Adams et al. |
| 2005/0144312 A1 | 6/2005 | Kadyk et al. |
| 2005/0184163 A1 | 8/2005 | de Jong |
| 2005/0184164 A1 | 8/2005 | de Jong |
| 2005/0184165 A1 | 8/2005 | de Jong |
| 2005/0188360 A1 | 8/2005 | de Jong |
| 2005/0216732 A1 | 9/2005 | Kipnis et al. |
| 2005/0262361 A1 | 11/2005 | Thibadeau |
| 2005/0279827 A1 | 12/2005 | Mascavage et al. |
| 2005/0289652 A1 * | 12/2005 | Sharma et al. ............ 726/26 |
| 2006/0005028 A1 | 1/2006 | Labaton |
| 2006/0010325 A1 | 1/2006 | Liu et al. |
| 2006/0015933 A1 | 1/2006 | Ballinger et al. |
| 2006/0036868 A1 | 2/2006 | Cicchitto |
| 2006/0043164 A1 | 3/2006 | Dowling et al. |
| 2006/0072747 A1 | 4/2006 | Wood et al. |
| 2006/0073812 A1 | 4/2006 | Punaganti Venkata et al. |
| 2006/0075133 A1 | 4/2006 | Kakivaya et al. |
| 2006/0075486 A1 | 4/2006 | Lin et al. |
| 2006/0101111 A1 | 5/2006 | Bouse et al. |
| 2006/0101506 A1 | 5/2006 | Gallo et al. |
| 2006/0173848 A1 | 8/2006 | Peterson et al. |
| 2006/0174104 A1 | 8/2006 | Crichton et al. |
| 2006/0206932 A1 | 9/2006 | Chong |
| 2006/0208066 A1 | 9/2006 | Finn et al. |
| 2006/0226243 A1 | 10/2006 | Dariel |
| 2006/0291664 A1 | 12/2006 | Suarez et al. |
| 2006/0294583 A1 | 12/2006 | Cowburn et al. |
| 2007/0014416 A1 | 1/2007 | Rivera et al. |
| 2007/0074034 A1 | 3/2007 | Adams et al. |
| 2007/0112721 A1 | 5/2007 | Archbold et al. |
| 2007/0113267 A1 | 5/2007 | Iwanski et al. |
| 2007/0113271 A1 | 5/2007 | Pleunis |
| 2007/0118891 A1 | 5/2007 | Buer |
| 2007/0162967 A1 | 7/2007 | de Jong et al. |
| 2007/0169084 A1 | 7/2007 | Frank et al. |
| 2007/0189534 A1 | 8/2007 | Wood et al. |

(56) References Cited

U.S. PATENT DOCUMENTS

| | | |
|---|---|---|
| 2007/0204333 A1 | 8/2007 | Lear et al. |
| 2007/0230706 A1 | 10/2007 | Youn |
| 2007/0271601 A1 | 11/2007 | Pomerantz |
| 2007/0277032 A1 | 11/2007 | Relyea |
| 2007/0280483 A1 | 12/2007 | Fu |
| 2007/0282881 A1 | 12/2007 | Relyea |
| 2007/0283163 A1 | 12/2007 | Relyea |
| 2007/0283427 A1 | 12/2007 | Gupta et al. |
| 2007/0288745 A1 | 12/2007 | Kwan |
| 2007/0288747 A1 | 12/2007 | Kwan |
| 2008/0005339 A1 | 1/2008 | Kwan |
| 2008/0019526 A1 | 1/2008 | Fu |
| 2008/0022086 A1 | 1/2008 | Ho |
| 2008/0022088 A1 | 1/2008 | Fu et al. |
| 2008/0022121 A1 | 1/2008 | Fu et al. |
| 2008/0022122 A1 | 1/2008 | Parkinson et al. |
| 2008/0022128 A1 | 1/2008 | Proudler et al. |
| 2008/0034216 A1 | 2/2008 | Law |
| 2008/0046982 A1 | 2/2008 | Parkinson |
| 2008/0056496 A1 | 3/2008 | Parkinson |
| 2008/0059790 A1 | 3/2008 | Parkinson |
| 2008/0059793 A1 | 3/2008 | Lord et al. |
| 2008/0069338 A1 | 3/2008 | Relyea |
| 2008/0069341 A1 | 3/2008 | Relyea |
| 2008/0072283 A1 | 3/2008 | Relyea |
| 2008/0077794 A1 | 3/2008 | Arnold et al. |
| 2008/0077803 A1 | 3/2008 | Leach et al. |
| 2008/0133514 A1 | 6/2008 | Relyea |
| 2008/0148047 A1 | 6/2008 | Appenzeller et al. |
| 2008/0189543 A1 | 8/2008 | Parkinson |
| 2008/0209225 A1 | 8/2008 | Lord |
| 2008/0229401 A1 | 9/2008 | Magne |
| 2009/0003608 A1 | 1/2009 | Lee et al. |
| 2009/0133107 A1 | 5/2009 | Thoursie |
| 2010/0313027 A1* | 12/2010 | Taylor .......................... 713/172 |

OTHER PUBLICATIONS

AMD Announces Specification for Open Platform Management Architecture, Feb. 28, 2005, pp. 1-2, http://www.thefreelibrary.com/AMD+Announces+Specification+for+Open+Platform+Management+Architecture-a0129342307.

Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.

Schneier, "Applied Cryptography: Protocols, Algorithms, and Source Code in C", 1996, John Wiley & Sons, Inc., Second Edition, pp. 455-456.

Zuccherato, Robert, Elliptic Curve Cryptography Support in Entrust, May 9, 2000.

Red Hat Certificate System, http://www.redhat.com/f/pdf/rhas/DirSecProductSheetCertificateSystem.pdf, Jun. 2005.

PKCS#11 v2.20: Cryptographic Token Interface Standard, RSA Laboratories, Jun. 28, 2004 (see, e.g. Chapter 10, Objects) (see www.rsasecurity.com, 407 pages).

Cryptographic Message Syntax, R. Housley, Request for Comments (RFC) 2630, Network Working Group, The Internet Society, Jun. 1999.

Balfanz (Dirk ABalfanz, "Access Control for Ad-Hoc Collaboration", Princeton University Jan. 2001).

Schneier, Bruce. Applied Cryptography, Second Edition. 1996 John Wiley and Sons, pp. 480-481.

* cited by examiner

TOKEN RECYCLING

FIELD OF THE INVENTION

The present invention relates generally to security in complex heterogenous processing environments and more particularly, to recycling or reactivating a smartcard or token once it has been locked.

BACKGROUND OF THE INVENTION

The size, scope and complexity of computer systems and networks continue to grow rapidly along with the sensitivity of the content of such systems. Further, open systems are proliferating, while conventional user access paradigms are changing for organizations of all types and sizes, from main offices or workplaces having dedicated IT systems to decentralized networks of IT servers and the like. Accordingly, system security rapidly becomes a major concern. Where user or worker access is accomplished through public networks such as the Internet, where remote access is accomplished through public networks, where a portion of the access is conducted through a public network, or where secure access is required for individuals in a multi-user environment, security and identify verification and management become more important in maintaining system and network security and data integrity.

Further complicating the challenge of maintaining security in a token-based computing environment and reducing or eliminating certain costs associated with maintaining security is the pervasive locking of tokens, such as a smartcards or the like when a security breach is detected. Due to such locking, many tokens become unusable. In conventional systems, a security officer or the like can be provided with a global password to unlock a smart card.

Several problems can arise if a security officer leaves their job, because the security officer password must be reset or changed. Further, such a global password system is not easily scalable. For example, in a large system where hundreds or perhaps thousands of tokens are in use, the security officer password must be the same for all tokens leading to a watershed security problem if the security officer password is compromised. Alternatively, if security officer passwords are managed on a per token basis, then a list associated with the security officer passwords for each token would be long and difficult to maintain and manage.

It would be desirable therefore to provide token management in a computer system environment that could adapt to the changing requirements of customers or third parties who manage system security, while reducing the security management burden on the token management system.

While a general background including problems in the art are described hereinabove, with occasional reference to related art or general concepts associated with the present invention, the above description is not intending to be limiting since the primary features of the present invention will be set forth in the description which follows. Some aspects of the present invention not specifically described herein may become obvious after a review of the attendant description, or may be learned by practice of the invention. Accordingly, it is to be understood that both the foregoing general description and the following detailed description are exemplary and explanatory only in nature and are not restrictive of the scope or applicability of the present invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide methods and systems for recycling a locked token in an enterprise having, for example, an enterprise security client (ESC) including a token interface and a security server. The locked token is generally locked in accordance with a security operation including a response to a failed authentication attempt, although it is conceivable that other lockout mechanisms are possible. In accordance with exemplary embodiments, a secure connection can be established between the locked token and the security server and a security process activated, for example, in the security server to determine an identity of an authorized user of the locked token. An unlock procedure can be activated to unlock the locked token upon receipt of an out-of-band parameter, such as an answer to a security question associated with a requester of the unlock procedure to produce an unlocked token. It will be appreciated that the out-of-band parameter can be provided by the requester of the unlock procedure in an independent communication, such as a telephonic communication to an enterprise agent associated with the security server. The requester can then be independently verified as the authorized user of the locked token. A password reset process can be activated in the ESC after the locked token is unlocked. The password reset process is associated with, for example, assigning a new password for the unlocked token, including a pre-assigned password or a password selected and entered by the requester of the unlock procedure. It will be appreciated that to maintain the highest level of security, the unlock procedure includes mutually authenticating a security parameter in both the security server and the locked token with the parameter being independently stored in the locked token and in the security server. Once mutual authentication is successfully performed the token is updated with a new password based on the receipt of the out-of-band parameter. It will be appreciated the token referenced herein includes one of a universal serial bus (USB) token, a smartcard or the like.

In accordance with other embodiments, a security server is provided in an enterprise computer system for recycling a locked token. The enterprise computer system can include an enterprise security client (ESC) and a token interface. The security server can include a communication interface, a data store such as a memory device, and a processor coupled to the communication interface and the data store. The processor can be configured to establish a secure channel between the security server and the locked token over the communication interface, such as through a connection to the ESC and through mutually authenticating a security parameter independently stored with the locked token and in the data store, to process a request from a requester associated with the ESC to unlock the locked token. A first identity of an owner of the locked token can be located in the data store, the first identity being stored with information associated with the locked token. The locked token can be unlocked if a flag stored in the data store in association with the information indicates that a second identity of the requester has been independently verified, such as through a separate telephone conversation with the requester, as matching the first identity of the owner of the locked token. The processor is further configured to store a new password that has been selected by the owner of the locked token or that has been assigned by the security processor, in the data store.

In still other embodiments, an enterprise security client (ESC) can be provided in a computer system that facilitates the unlocking of a locked token. The computer system preferably includes a security server. The enterprise security client includes a token interface, a communication interface, and a client processor coupled to the token interface and the communication interface. The client processor can be configured to activate a token unlock process associated with the connection of the locked token to the token interface. The activation of the token unlock process is associated with a request made to the server by a requester to unlock the token. A secure channel established between a server-based authentication process and token unlock process can be facilitated by the processor in response to the request to unlock the token. It will be appreciated that the server-based authentication process and the token unlock process mutually authenticate a security parameter that is independently stored, for example, in the locked token and the security server. The server-based authentication process then unlocks the locked token after independently verifying that an identity of the requester matches an identity of the owner of the locked token stored in the security server, and updates the token with a new password.

In still other embodiments, a computer system can be provided for recycling a locked token in an enterprise. The computer system can nominally include a server, an enterprise security client (ESC), a token interface, and a communication channel connecting the server, the ESC and the token interface. A secure communication can be established between the locked token and the server through the ESC and the communication channel in response to a request made by a requester to unlock the locked token. The server and the locked token are configured to mutually authenticate, for example by verifying or validating a security parameter independently stored with the token and with the security server upon successfully validating an authentication credential independently obtained by an enterprise agent, such as through a separate telephone conversation. The authentication credential verifies an identity of the requester and can be, for example, a response to an identify verification question presented on a separate channel such as a telephone channel established between the enterprise agent and the requester. The response and question can include, for example, the answer to a verification question such as mother's maiden name or the like. The locked token is unlocked based on a successful result of the mutual authentication and the validation of the authentication credential. A password reset process can be activated in the ESC after the locked token is unlocked and provides a new password for the unlocked token, such as a pre-assigned password or a password chosen and entered by the requester. It will be appreciated the token referenced herein includes one of a universal serial bus (USB) token, a smartcard or the like.

Reference will now be made in detail to exemplary embodiments of the invention, which are illustrated in the accompanying drawings. Wherever possible, the same reference numbers will be used throughout the drawings to refer to the same or like parts.

Figure 1:
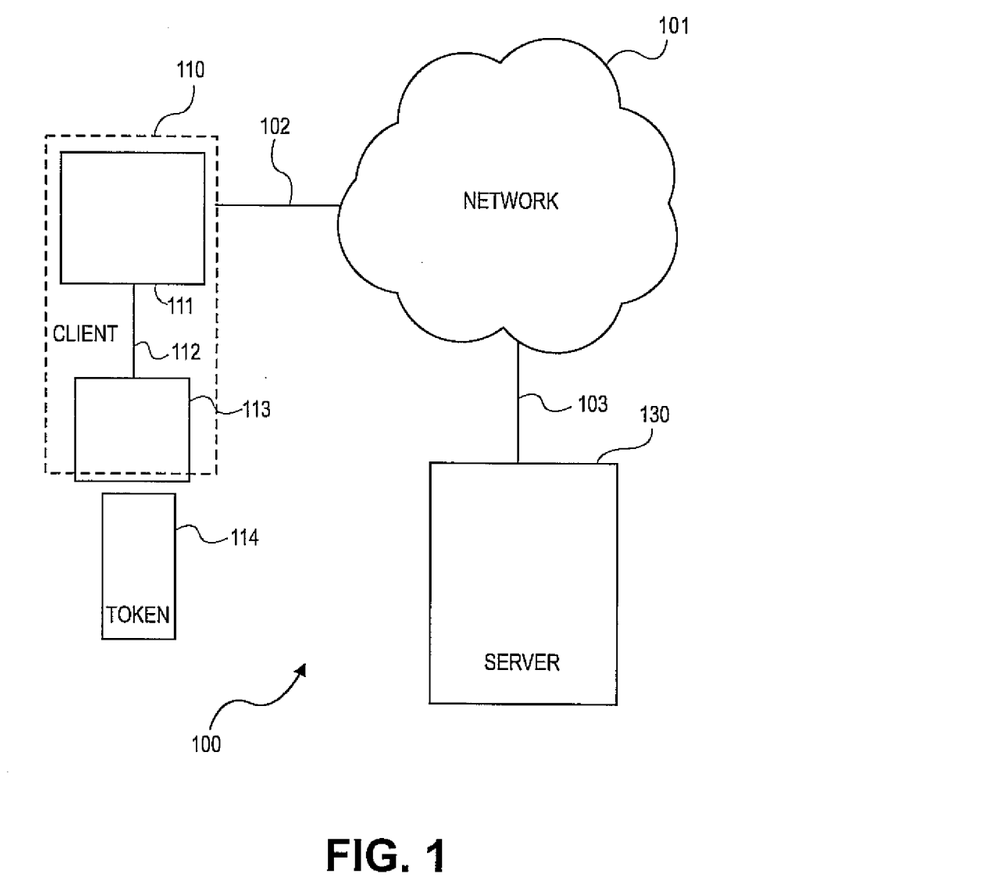
FIG. 1 is a diagram illustrating exemplary components of a computer system including a token, consistent with embodiments of the present invention.

Referring now to FIG. 1, a simplified and representative environment associated with an exemplary computer system 100 will be discussed and described. The environment includes a client 110, a token 114, a server 130, and a network 101. The server 130 and client 110 are connected through the network 101 via a connection 102 and connection 103, each of which can be a connection such as a wired or wireless connection. It will also be appreciated that in some instances, the server 130 and the client 110, if located within the same computer, can be connected directly with a data bus or high speed serial connection or the like, in which case the network 101 would not be used. The server 130 can be associated with a token issuing entity enterprise or agency, and naturally has access to information stored locally at the server 130, and also can access information stored remotely in various external data systems (not shown) provided a proper interface exists to the external data systems. It will be appreciated that the server 130 may be a general purpose computer or dedicated computing platform configured to execute secure and/or unsecure (or open) applications through a multiple user operating system (not shown). While many operations are performed in connection with the client 110, the server 130 can operate independently for certain procedures as will be appreciated. The server 130 may be implemented with general purpose server platforms as known to those skilled in the art from Intel, Advanced Micro Devices, Hewlett-Packard, and/or others or can be implemented with other custom configured server architectures. The server 130 may interact with the client 110 over connection 102 and connection 103 and may also interact with and interface to the token 114 over connections 102 and 103 through the client 110.

It will be appreciated that the client 110 can include a general purpose computer or dedicated computing platform configured to execute secure and/or open applications through the multi-user operating system of server 130 or can operate through an independent operating system or independent version of the operating system of server 130. The client 110 can include a personal computer, a workstation, a thin client, a thick client, or other similar computing platform. It will be appreciated that thin client means a computer or client in a client-server architecture having little or no application logic and therefore having a small boot image. A thin client depends primarily on the central server, such as server 130, for processing activities. Therefore client 110, when operating as a thin client generally can have only that software that is required to connect to server 130, to perform a login procedure, and the like.

It can further be seen that client 110 is configured to interface with the token 114 through a token interface 113 connected to, for example, a processor 111, through a link 112 such as a data bus or the like. The token 114 is connected to token interface 113 using an interface including a standard interface such as a universal serial bus (USB) connection, an edge connector, or some other type of connection as would be appreciated. The client 110, the token 114 and the server 130 can be configured in accordance with known techniques so that the server 130 can connect to the token 114 transparently through the client 110. In accordance with known techniques, one or more of connection 102 and connection 103 can be a secure connection, however, additional secure channels or secure connection layers such as a secure sockets layer (SSL) within the connection can be established separately to provide security on a physically un-secure connection or even a secure physical connection between the server 130 and the token 114, for the purposes of for example conducting mutual authentication prior to conducting card management functions as will be described in greater detail hereinafter.

In accordance with various embodiments, the server 130 can be configured to maintain information associated with an authentication credential such as a social security number, answer to a secret question, or the like. The server 130 independently manages the authentication credential and a query associated with the authentication credential that can act as a reminder or prompt for a user to enter the credential as will be described. It will be appreciated that while some systems use various methods for authentication, the use of a server or agent to manage such credentials in connection with recycling or remotely resetting a password associated with a token or smart card provides enhanced security.

Figure 2:
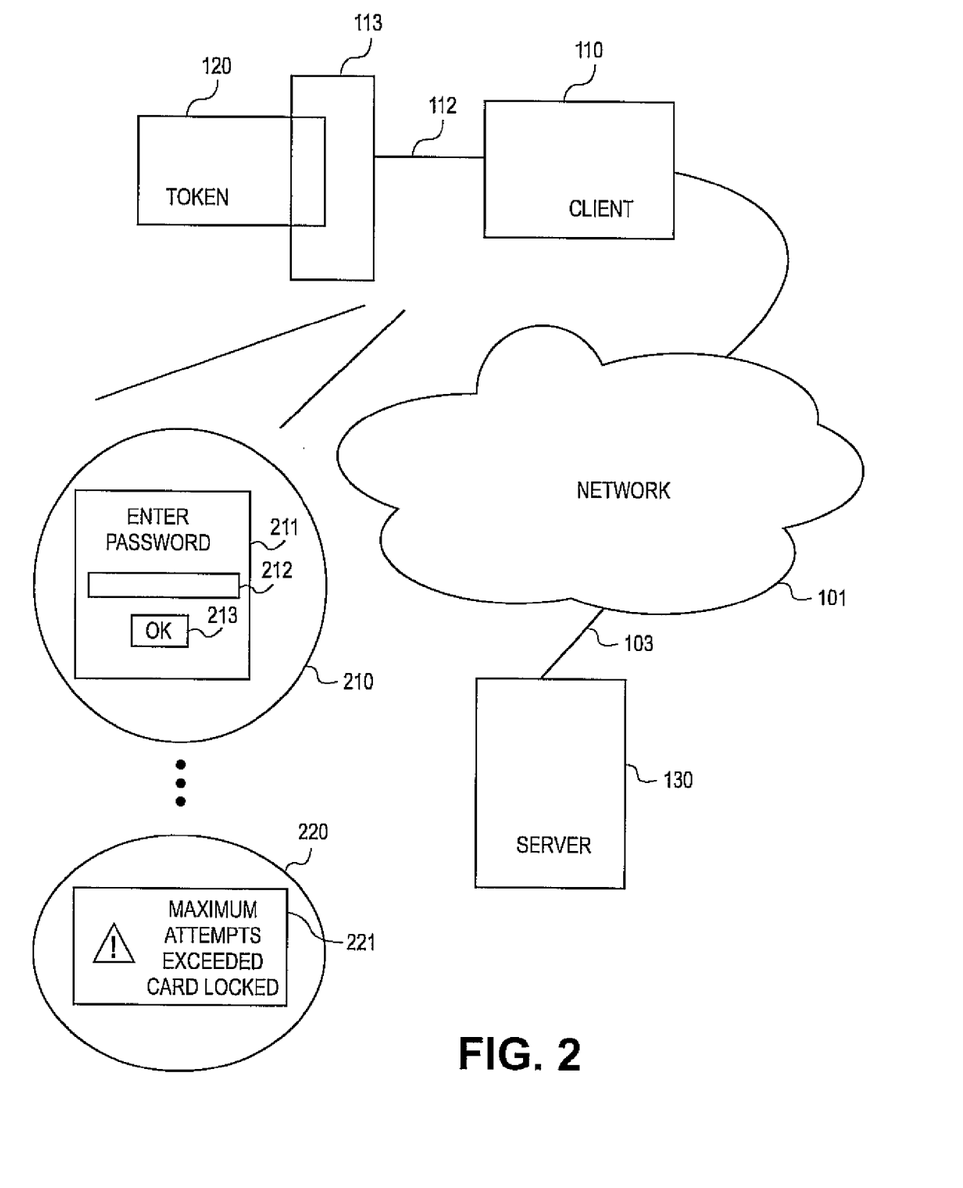
FIG. 2 is a diagram illustrating an exemplary locked token consistent with operation in accordance with the present invention.

To better understand the circumstances that lead to the need for smart card recycling, an exemplary scenario involving a smartcard or token lockout is shown in FIG. 2. As previously described, token 120 can be connected to server 130 for purposes of normal card use, for purposes of card management, or the like which requires authentication such as through a password entry operation 210. When token 120 is connected such as through insertion into interface 113, the insertion will be detected by client 110 through connection 112. It will also be appreciated that in most instances, the token 120 will derive power from the interface 113, that is, will derive power from the host device such as a token interface unit. The interface unit will provide power as part of the interface standard. For example, the USB standard calls for pins 1 and 4 to provide Vcc and GND, with Vcc being around 5 volts DC. It should be noted that in some tokens, additional features are present for additional security factors such as biometrics or the like. Self powered tokens and tokens that include processors are also possible, but in any case, the application of power to the token will allow the token to be detected through one or a combination of electrical and processing methods as will be appreciated.

The insertion activity will begin a session between the token 120 and the client 110 and also the server 130 through client 110 by way of network 101. The action of insertion will lead to the activation of a dialog 211 that will request the entry of a password into text entry box 212. When the password is entered the requester, such as the owner of the token 120 can, through the use of a pointing device or input device active activates an acknowledgement button such as the OK button 213 to transfer the password to the appropriate process. It will be appreciated that the password request process can reside in the token 120, on the client 110, or on the server 130 depending on the specific implementation, however, the insertion event will cause the dialog 211 to be displayed on a local display (not shown) such as a display used in connection with the client 110 that displays the dialog and requests the password information in accordance with a two factor security model. The token 120 is an integral part of the two factor model where the token 120 represents a first posessory factor in the model. In other words, possession of the token 120 assumes that the holder of the token 120 is the authorized user.

The password which is entered into text entry box 212 and can include, for example a PIN (personal identification number) or the like, represents the second factor in the two factor security model and, in connection with the first factor, the possession of the token 120, completes the two-factor security model. In the event that, for example, the holder of the token is not the authorized user, and the password is unknown to this holder, then it is likely that an access attempt will result in an incorrect password being entered. In many systems, a maximum number of attempts is specified to defeat brute force attacks, that is attacks where computer assisted means for generating successive password attempts is used in the hope of eventually arriving at a correct password. The maximum number of attempts is often set to a low number such as three or the like, although it is often noted that an arbitrarily low number such as three can prevent access by a legitimate user who has simply forgotten their password.

When the maximum number of attempts allowed as been exceeded, security lockout operation 220 can be performed where an error message dialog 221 is displayed and the card is locked internally. When the card is locked, it can no longer be used and must be discarded. It can be seen that, in situations where the maximum number of attempts is low, a large number of lockouts can occur leading to unnecessary expense in the form of useless cards or tokens. In the case where important information is stored on the token, the consequences of such a lockout operation can be particularly acute.

Figure 3:
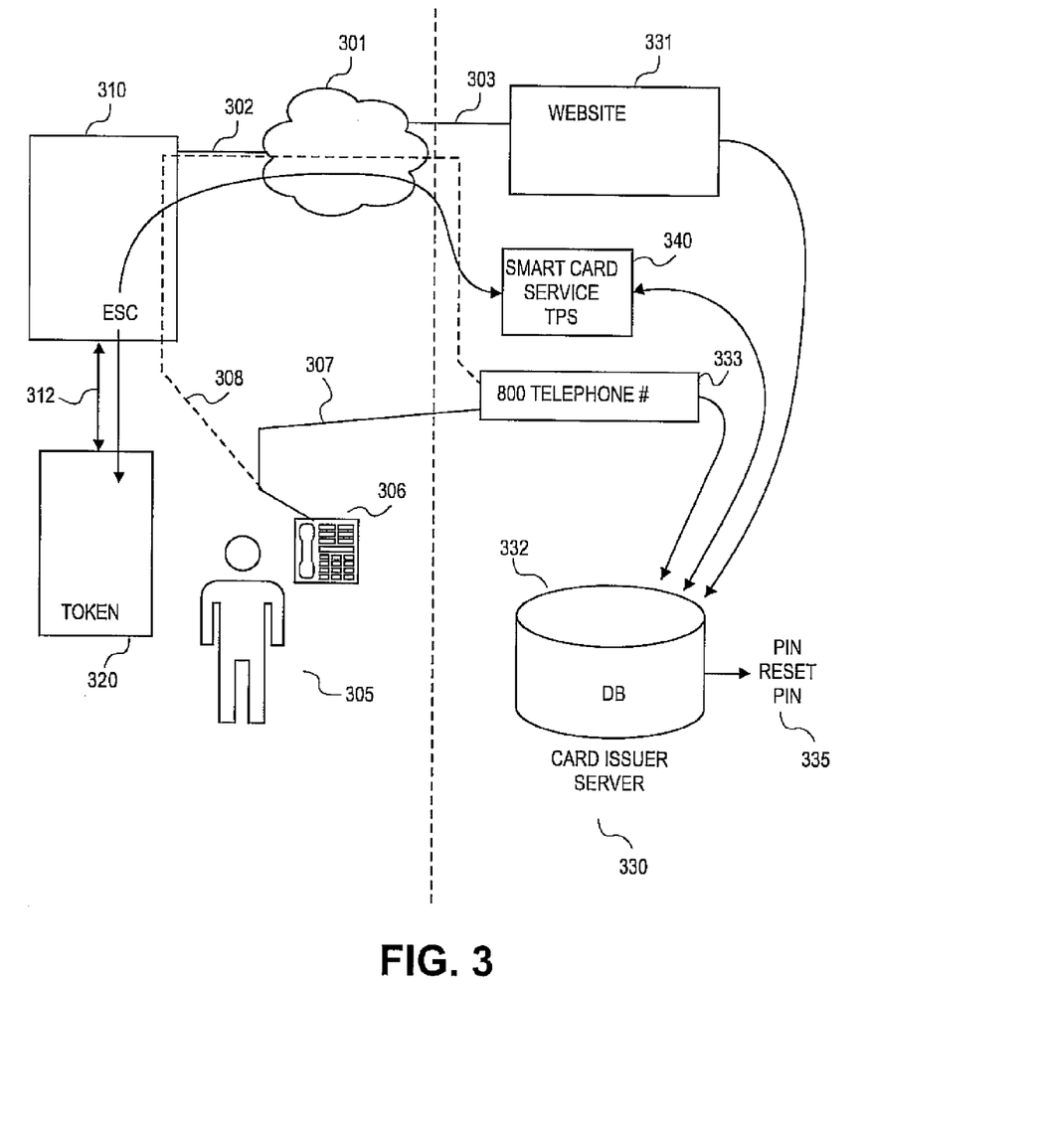
FIG. 3 is a diagram illustrating exemplary components of a computer system for unlocking a token consistent with embodiments of the present invention.

Accordingly, a system can be provided in accordance with various embodiments as shown in FIG. 3 to unlock or otherwise recycle a token or smart card, such as token 320 which in the present example is initially locked. Accordingly, reference to a locked token simply refers to token that is in the locked condition, and further, reference simply to a token can refer to a locked or unlocked token. In a recycling scenario, token 320 can be inserted into a token interface (not shown) by a requester 305 of the recycle or reset, and thus a connection 312 established with enterprise security client (ESC) 310 to activate a process such as a token interface process or the like. The token 320 or token interface process can be coupled to a card services entity 330 that has, for example, a server hosting a website 331 through which an interface with the ESC 310 and the token 320 can be established, such as through a network 301 and network connections 302 and 303. An independent communication channel can be established between the requester 305 and the card services entity 330, such as through a toll-free connection 307 between a phone services process 333 and a telephone 306 through which the requester 305 and an automated attendant or a representative (not shown) of the card services entity 330 can communicate. Alternatively, a network based voice or other channel 308, such as a voice over internet protocol (VoIP), or email connections can be established to connect the requester 305 and the representative. Regardless of the exact nature of the channel 307 or 308, it will be sufficient to note that the channel is an out-of-band channel, apart from the connection between the token 320 and the portions of card services entity 330, such as the website 331 or the like.

After a connection is established between the token 320 and the card services entity 330 a secure channel can be established between the token 320 and a token processing system (TPS) 340 to perform authentication. It will be appreciated that, while the connection between the token 320 and the TPS 340 may be protected using a secure sockets layer (SSL) type protection, additional security can be provided as will be described, by establishing a secure channel with the token 320 for mutual authentication. The TPS 340 will check the data store 332 to determine the status of the token 320 such as through a flag or the like. Since the token 320 is locked out, it will be appreciated that any initial attempt at authentication will fail, so it will be useful to display a dialog or the like to indicate to the requester 305 that the card or token 320 is locked and to allow the requester 305 to specifically indicate or request a recycling or reset operation for the token 320. The requester 305 will also engage in a dialog with the card services entity 330 over the out-of-band channel described above, either contemporaneously with the request for reset or before the request, using for example the telephone 306. The requester 305 can interact with card services entity 330 through phone services process 333, which as noted can be an automated system such as an automated attendant configured to accept voice input or keypad input in response to outgoing scripts or messages or can be a live attendant such as a customer service or security representative.

The phone services process 333 can be configured to ask the requester to respond to a question such as a security question or other prompt that is stored, for example, in the data store 332. The question can include for example, a mother's maiden name or the like or can be a more complex query depending on the sensitivity or security level associated with the requester 305 and overall operating environment. It will be appreciated that in the case where the phone services process 333 includes a live operator or attendant, a separate password or pin 335 can be required by the card services agency in order to process a request for a password or pin reset from a requester such as requester 305. When the requester 305 successfully responds to the security question, then the phone services process 333 can update the status of the token 320 as being permitted to be reset such as by setting a flag or the like in data store 332 associated with token 320 and requester 305. Subsequent to setting of the flag permitting reset, the TPS 340 will verify that the card or token 320 has been authorized to and thus can be reset and will either assign a new password or allow a new password to be entered by requester 305.

Figure 4:
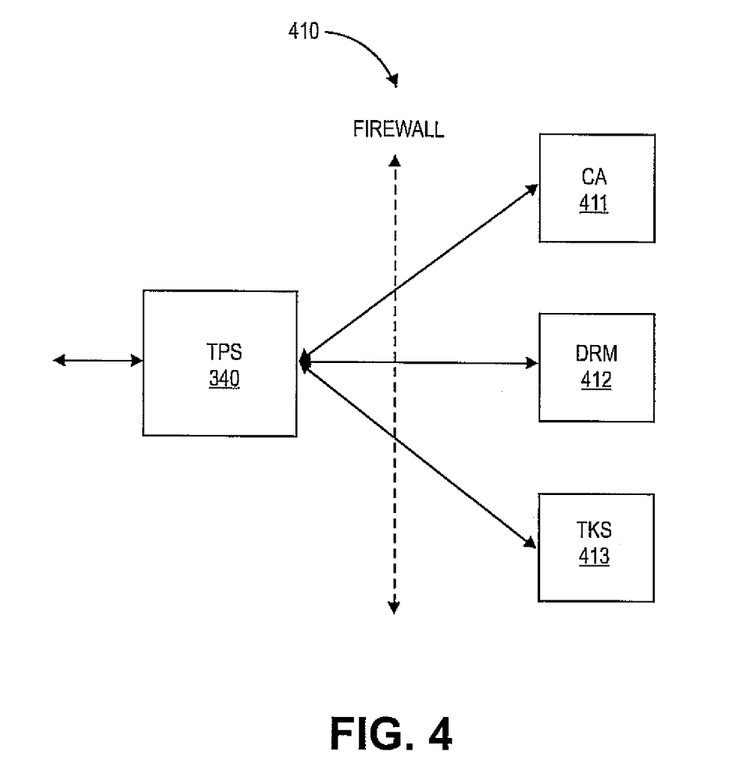
FIG. 4 is a diagram illustrating components associated with a token processing system consistent with embodiments of the present invention.

A typical server 330 with server based authentication process such as TPS 340 further includes subsystems or subprocesses as shown in FIG. 4. Accordingly, a typical server based authentication system can include, on the appropriate side of, for example, a firewall 410, a certificate authority (CA) 411, a data recovery manager (DRM) 412 and a token key service (TKS) 413 for providing security support. For example, CA 411 can be configured as a certificate authority for generating certificates according to a standard such as the X.509 standard. DRM 412 can be configured to manage long term key recovery such as for recovery of keys used for old emails or alternatively, can be adapted for recovery of information associated with locked out tokens or smart cards in accordance with the present invention, for example. TKS 413 can be configured as a token key service to maintain security master keys, which are used during mutual authentication, for example, as described herein. The token keys are preferably symmetric keys derived from a single master key (MK) combined with the token serial number according to a diversification mechanism as specified, for example, in various security standards. The manufacturer of the token can write the keys, which can be encrypted with data encryption standard 2 (DES 2) encryption for additional security to form a DES2 key set, into the token when it is initialized. The token manufacturer can also transmit the single MK to the administrator of the server based authentication process TPS 340, where the key can be installed into a cryptographic module associated with the server based authentication process TPS 340. It should be noted that once the MK is passed to the server based authentication process TPS 340, it typically cannot be extracted from the cryptographic module. During the initial enrollment associated with the token, the token keys, such as the DES2 key set, can be replaced with another set of token keys derived from a new or different Master Key which is not known to the manufacturer. When the server based authentication process TPS 340 needs to establish a secure channel with the token, as will be described, secure channel session keys for the token can be derived by a subprocess such as DRM 412. Other subprocesses such as TKS 413 can be used to perform additional security functions such as data recovery. For example, in TKS 413, private keys from a user can be recovered in connection with an existing module associated with the server 330, particularly after identity verification is independently performed.

Figure 5:
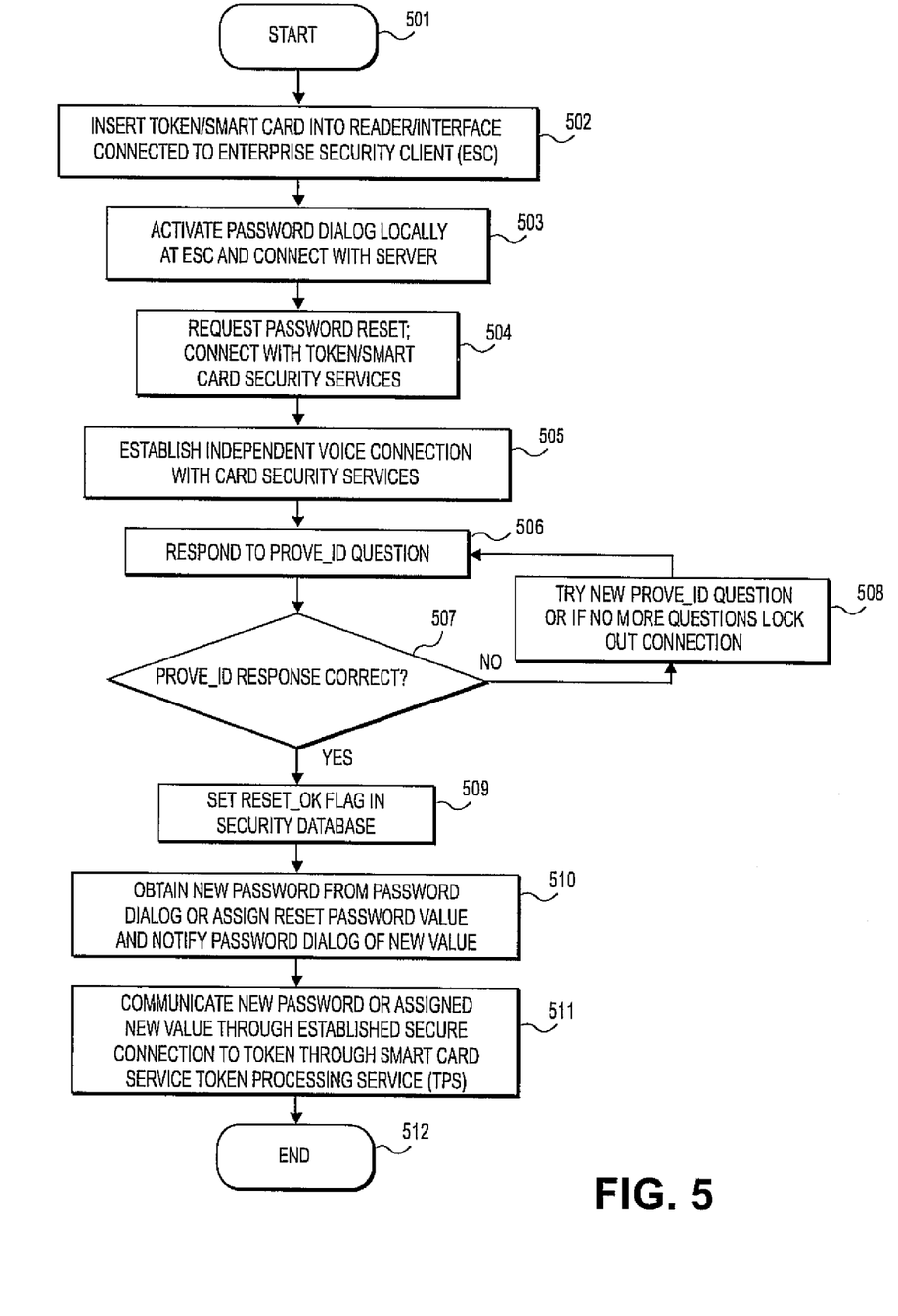
FIG. 5 is a flow chart illustrating an exemplary procedure associated with unlocking a token consistent with embodiments of the present invention.

An exemplary procedure for unlocking or otherwise recycling a locked token is shown and described in connection with FIG. 5. By token, reference is made to any token capable of processing card management operations associated with an unlock procedure or the like. It will be appreciated that an exemplary token can include a processor for execution of processes, programs, applets and the like as will be described in greater detail. The token can further be provided with a token-based authentication process that can be used, for example, to perform mutual authentication in accordance with the invention. After start at 501, the token or smartcard can be inserted into an interface or reader coupled to an enterprise security client at 502. A process such as a dialog for entering a password can be displayed at the ESC and the token can be connected to a server, which can be executing a server-based authentication process such as TPS 340 as described above at 503. Since, in accordance with various embodiments, the token is locked, the password dialog can display an indication that the token is locked and provide an option to unlock the card along with, for example, a toll free telephone number to call to provide independent verification of the identity of the requester of the unlock. The requester can request the unlock at 504 whereupon a connection can be established between the token and the card services entity, such as TPS 340. The requester can establish an independent connection such as a voice connection through a telephone connection or the like at 505. In some embodiments, it is possible that some other type of connection can be established such as an email connection, instant message connection, or VoIP connection or the like, can be established.

After a voice connection is established, a question such as a PROVE_ID question can be presented either through a live operator or a recorded message, whereupon the requester can respond at 506 so as to verify their identity. If the response is determined to be correct at 507, then a flag such as a RESET_OK flag can be set in the security database at 509. As previously noted, it may be useful to require a password or PIN of the operator or the security services person, in order to be permitted to set the flag. If the response is determined at 507 not to be correct, then a new question can be attempted at 508, in which case step 506 can be repeated or if no additional questions are available the card lockout will continue. Once the RESET_OK flag is set, a message can be sent to the dialog for password entry, or some other type of communication such as an email can be sent to the requester either providing a newly assigned password or prompting the requester to enter a new password at 510. The token can then be updated through the secure connection by the token processing system such as TPS 340 at 511. While the procedure is indicated as ending at 512, it will be appreciated that the procedure can be repeated for any number of tokens or portions of the procedure, can be repeated if a wrong answer to the PROVE_ID question is entered and a new attempt is desired, or the like.

Figure 6:
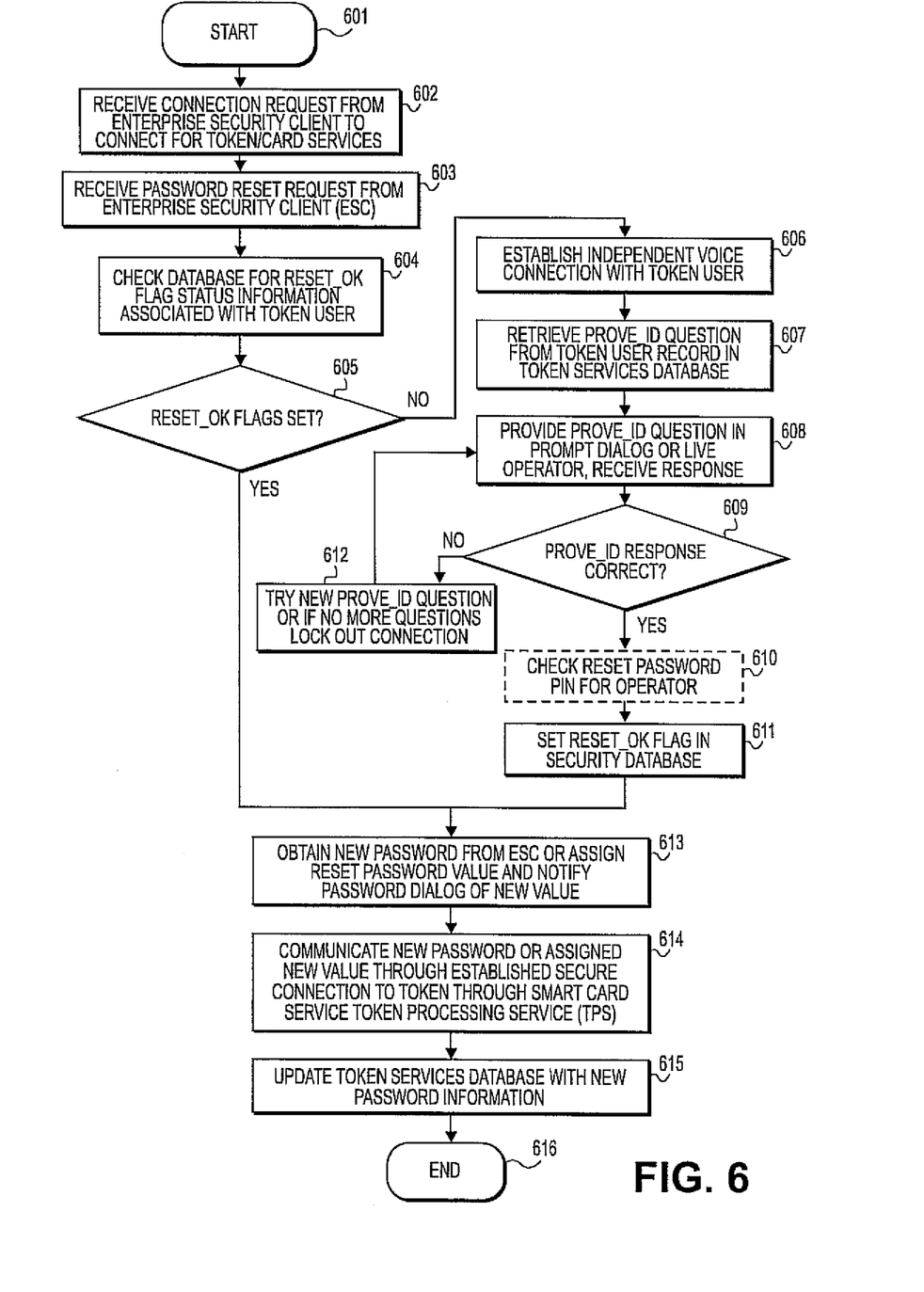
FIG. 6 is a flow chart illustrating another exemplary procedure associated with unlocking a token consistent with embodiments of the present invention.

An alternative procedure, such as a procedure from a server perspective, is shown and described in connection with FIG. 6. After start at 601, a connection request can be received from an enterprise security client (ESC) at 602 to make a connection for card services, such as to unlock a locked token. The connection will be a secure connection such as through a secure sockets layer (SSL) connection or the like. After the connection is established, a request can be received to unlock the token by, for example, resetting the password at 603. Upon receiving the request the server can check to determine whether the RESET_OK flag has been set at 604. If the RESET_OK flag is not set, then an independent communication connection such as a voice connection is established with the requester at 606. A question such as a PROVE_ID question can be retrieved in connection with the token information as stored in a token services database in connection with a token user record or the like at 607. Once received, the PROVE_ID question can be provided in a prompt, dialog, live operator or the like a response to which can be received at 608. If the response is correct as determined at 609, and after an optional procedure of checking for a password or PIN from the operator at 610, the RESET_OK flat can be set in the security database at 611. If the correct response is not provided, a new question can be provided at 612, or, if no additional questions are available, then the card or token will remain locked out.

If the RESET_OK flag is set at 605, or after setting the RESET_OK flag at 611, then the new password can be obtained from the ESC or assigned by the server and communicated to the password dialog at 613. The new password can be communicated to the server through the established secure connection between the ESC and token processing system (TPS) at 614 which also includes mutual authentication using the new password. After mutual authentication, the token can be updated with the new password information at 615. While the procedure is indicated as ending at 616, it will be appreciated that the procedure can be repeated for any number of tokens or can be repeated if a wrong answer to the PROVE_ID question is entered and a new attempt is desired or the like.

It will be appreciated that in connection with both of the above described exemplary procedures, during mutual authentication, the server can compare security keys such as the symmetrical keys stored in both the server such as in DRM 412 or in TKS 413 and in the token in one of a number of possible ways involving, for example, handshaking between the token and the server over the secure connection. If the PROVE ill question and thus the identity of the requester as the owner of the token is verified or otherwise authenticated, then the new password can be written to the token.

Figure 7:
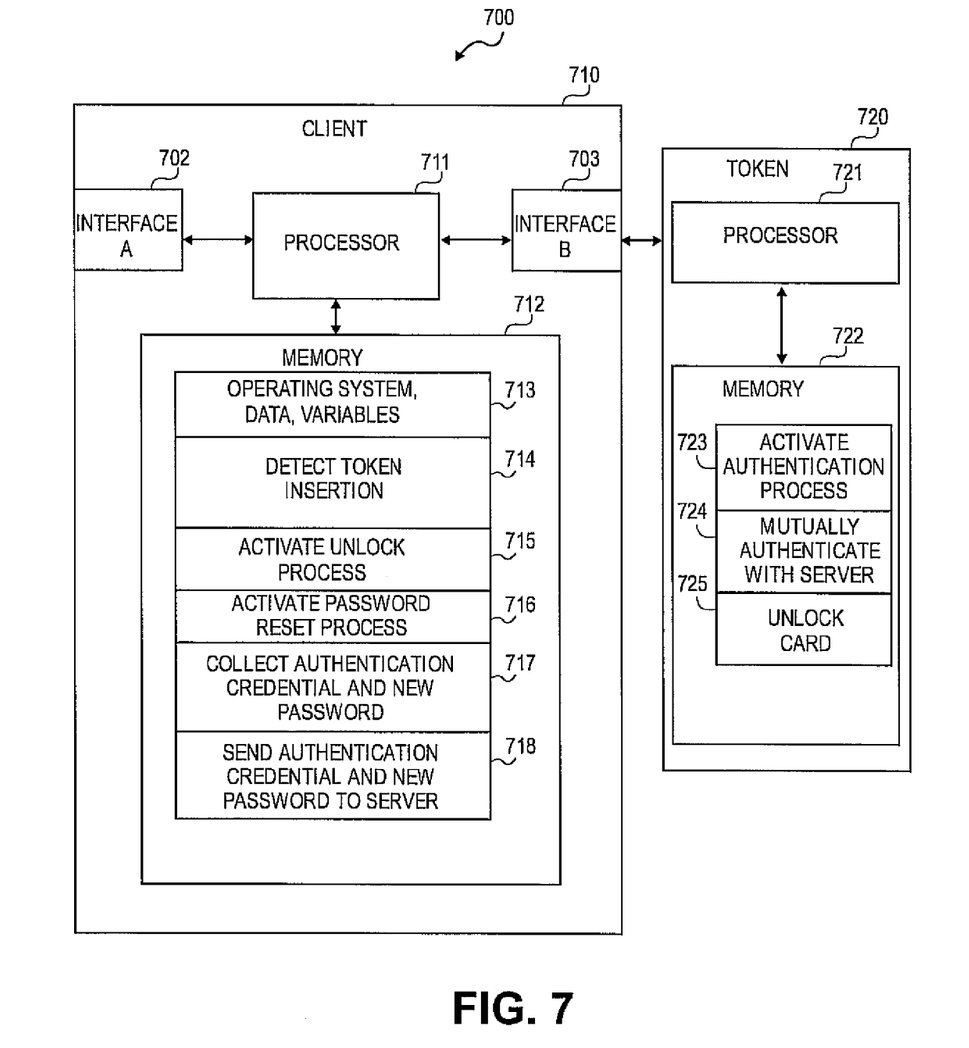
FIG. 7 is a block diagram illustrating portions of an exemplary client computer with interfaces and a token consistent with embodiments of the present invention.

At least a portion 700 of an exemplary embodiment consistent with the present invention can be seen in connection with FIG. 7. A client 710 and a token 720 are shown in a connected condition. The client 710 can include processor 711 and memory 712. The token 720 includes a processor 721 and a memory 722. The memory 712 can include processes which can be loaded into the processor 711, such as an operating system, data and variables 713 and other processes as described below. The client 710 can further include an interface A 702 for connection to other entities such as a server over a communications link and a token interface B 703.

The token 720 can be inserted, for example into the token interface B 703, whereupon the insertion of the token is detected at 714. In response to insertion, on the token side, a token based authentication process 723 can be activated. A user such as an unlock requester, through interaction with the client 710, can activate an unlock process 715 based on several possible events including the insertion of the locked token. The unlock process 715 can cause a dialog to be displayed such as a dialog indicating that the token is locked and an option to unlock the card by resetting the password and other information including a telephone number for establishing an independent connection. By selecting the unlock option, a password reset can be requested activating a password reset process 716. The requester in the mean time can establish a voice connection with the card services entity to independently verify an authentication credential such as an answer to a secret question. If the answer provided is correct, a reset flag can be set in the server as described above, and a the token can be unlocked. In alternative embodiments, the answer to the question can be provided by the client 710 after being collected in a dialog along with a new password at 717, whereupon the information can be sent to the server at 718.

When the server successfully validates the authentication credential, mutual authentication can take place between the server and a mutual authentication procedure 724 in token 720, for example over a secure channel. Upon successful mutual authentication, the new password can be provided by the server and updated in procedure 725. It will be appreciated that in addition to storing the new password, the token 720 can store additional data such as the above noted symmetrical keys, other security information, or the like in connection with procedure.

Figure 8:
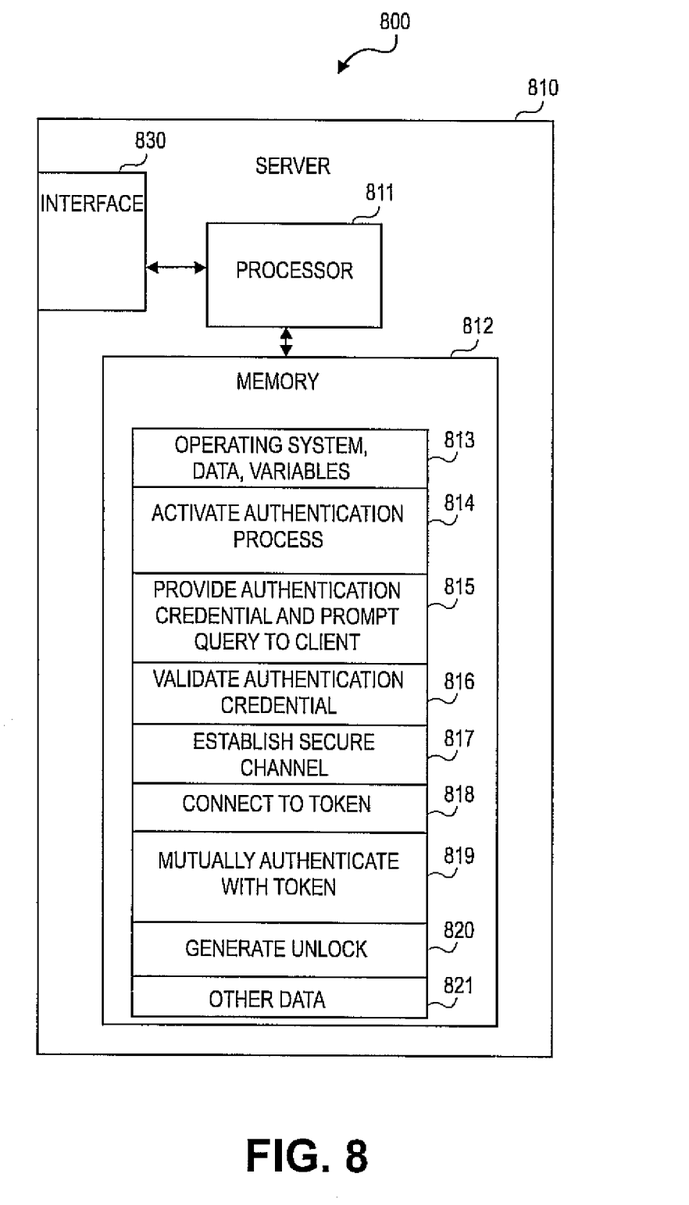
FIG. 8 is a block diagram illustrating portions of an exemplary server computer consistent with embodiments of the present invention.

Another portion 800 of an exemplary embodiment can be seen in connection with FIG. 8. A server 810 can include processor 811 and memory 812, and an interface 830 for establishing connections with other entities such as, for example, the client 710 and the token 720, as illustrated in FIG. 7. The connection between the server 810 and the token 720 is preferably established as a secure connection. The memory 812 can include processes which can be loaded into the processor 811, such as an operating system, data and variables 813 and other processes as described below. In response to an unlock process in the client 710, and an independent connection established between the requester of the unlock and an agent of the card services entity, the server 810 can activate authentication process 814, which can retrieve information associated with a query that can be provided to the operator in procedure 815 and alternatively provide the question to the client. In the present example, the response to the query can be referred to as an authentication credential. Based on the response provided by the user or requester the authentication credential can be validated in procedure 816. Upon successful validation of the authentication credential, a secure channel between the server 810 and the token 720 can be established in procedure 817 and a connection made between the server 810 and the token 720 in procedure 818. Once the secure channel is established and a connection made, a mutual authentication procedure 819 can be performed between the server 810 and the token 720 based on the symmetrical keys as described herein above. If the mutual authentication procedure 819 is successful, then the new or reset password entered by the user can be "generated" in procedure 820 and can be sent to the token 720 by the server 810, and the token can be updated with the new password by writing the password to memory 722 as a user privileged data object or the like. It should be noted that "generating" the new or reset password in procedure 820, can mean transferring the new password collected by the user to the token 720, for example, after validation of the authentication credential and mutual authentication. In alternative embodiments, the server may actually generate a new or reset password and notify the user, for example in the password reset dialog as described above, of the new password. It will be appreciated that other data 821 can include the symmetrical keys previously noted, at least one of which is used for mutual authentication.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   establishing a first secure connection between a locked token and a security server system through a client device coupled to the locked token;
   activating a process to unlock the locked token via the first secure connection;
   establishing a second secure connection between the client device and the security server system in response to activating the process to unlock the locked token, wherein the second secure connection differs from the first secure connection;
   prompting a user for an authentication credential via the second secure connection;
   determining that the user has correctly provided the authentication credential; and
   unlocking, by a processor, the locked token in response to determining that the user has correctly provided the authentication credential, the unlocking comprising mutually authenticating the locked token and the security server system using symmetric keys derived from a master key, wherein the symmetric keys are stored in the locked token and the security server system.

2. The method of claim 1, further comprising activating a password reset process in response to unlocking the locked token, the password reset process associated with a new password for the unlocked token, wherein the new password comprises one of an assigned password and a password entered by the user.

3. The method of claim 1, further comprising:
   updating the unlocked token with a new password in response to the mutual authentication.

4. The method of claim 1, wherein the token comprises one of a universal serial bus (USB) token and a smartcard.

5. An apparatus comprising:
   a security server system to:
      establish a first secure connection between a locked token and the security server system through a client device coupled to the locked token;
      activate a process to unlock the locked token via the first secure connection;
      establish a second secure connection between the client device and the security server system in response to activating the process to unlock the locked token, wherein the second secure connection differs from the first secure connection;
      prompt a user for an authentication credential via the second secure connection;
      determine that the user has correctly provided the authentication credential; and
      unlock, by a processor, the locked token in response to determining that the user has correctly provided the authentication credential, the unlock comprising mutually authenticating the locked token and the security server system using symmetric keys derived from a master key, wherein the symmetric keys are stored in the locked token and the security server system.

6. A non-transitory computer readable medium comprising computer executable instructions, that when executed by a processor cause the processor to perform operations comprising:
   establishing a first secure connection between a locked token and a security server system through a client device coupled to the locked token;
   activating a process to unlock the locked token via the first secure connection;
   establishing a second secure connection between the client device and the security server system in response to activating the process to unlock the locked token, wherein the second secure connection differs from the first secure connection;
   prompting a user for an authentication credential via the second secure connection;
   determining that the user has correctly provided the authentication credential; and
   unlocking, by the processor, the locked token in response to determining that the user has correctly provided the authentication credential, the unlocking comprising mutually authenticating the locked token and the security server system using symmetric keys derived from a master key, wherein the symmetric keys are stored in the locked token and the security server system.

7. A security server system comprising:
   a communication interface;
   a data store; and
   a processor coupled to the communication interface and the data store, the processor to:
      establish a first secure channel between a locked token and the security server system through a client device coupled to the locked token;
      activate a process to unlock the locked token via the first secure channel;
      establish a second secure channel between the client device and the security server system in response to activating the process to unlock the locked token, wherein the second secure channel differs from the first secure channel;
      prompt a user for an authentication credential via the second secure channel;
      determine that the user has correctly provided the authentication credential; and
      unlock the locked token in response to determining that the user has correctly provided the authentication credential the unlock comprising mutually authenticating the locked token and the security server system using symmetric keys derived from a master key, wherein the symmetric keys are stored in the locked token and the security server system.

8. The security server system of claim 7, the processor to store a new password that has been one of selected by the user and assigned by the security system server, in the data store.

9. An enterprise security client (ESC) comprising:
   a token interface;
   a communication interface; and
   a processor coupled to the token interface and the communication interface, the processor to:
      establish a first secure connection between a locked token and a security server system;
      activate a process to unlock the locked token via the first secure connection;
      establish a second secure connection with the security server system in response to activating the process to unlock the locked token, wherein the second secure connection differs from the first secure connection;

receive an indication that the security server system has verified an identity of a user via the second secure connection; and unlock the locked token in response to the indication, the unlock comprising mutually authenticating the locked token and the security server system using symmetric keys derived from a master key, wherein the symmetric keys are stored in the locked token and the security server system.

10. The enterprise security of client of claim 9, the processor to update the unlocked token with a new password in response to unlocking the locked token.

11. A computer system comprising:
a memory; and
a processor coupled to the memory, the processor to:
establish a first secure channel between a locked token and a security server system through an enterprise security client (ESC), wherein the ESC is coupled to the locked token;
activate a process to unlock the locked token via the first secure channel;
establish a second secure channel between the ESC and the security server system in response to activating the process to unlock the locked token, wherein the second secure channel differs from the first secure channel;
prompt a user for an authentication credential via the second secure channel;
determine that the user has correctly provided the authentication credential; and
unlock the locked token in response to determining that the user has correctly provided the authentication credential, the unlock comprising mutually authenticating the locked token and the security server system using symmetric keys derived from a master key, wherein the symmetric keys are stored in the locked token and the security server system.

12. The computer system of claim 11, the computer system to activate a password reset process in the ESC to provide a new password for the unlocked token in response to unlocking the locked token.

13. The computer system of claim 12, wherein the new password comprises one of a pre-assigned password or a password entered by the user.

14. The computer system of claim 11, wherein the authentication credential comprises an identity verification question.

15. The computer system of claim 14, wherein the second secure channel comprises a telephone channel.

16. The computer system of claim 11, wherein the token comprises one of a universal serial bus (USB) token or a smartcard.

* * * * *